US012576875B2

(12) United States Patent (10) Patent No.: US 12,576,875 B2
Vassilovski et al. (45) Date of Patent: Mar. 17, 2026

(54) VEHICLE MANEUVER ESTIMATION ACCURACY CONVEYANCE

(71) Applicant: QUALCOMM Incorporated, San Diego, CA (US)

(72) Inventors: Dan Vassilovski, Del Mar, CA (US); Hong Cheng, Basking Ridge, NJ (US); Lan Yu, Beijing (CN); Gene Wesley Marsh, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 530 days.

(21) Appl. No.: 17/785,771

(22) PCT Filed: Jan. 16, 2020

(86) PCT No.: PCT/CN2020/072495
§ 371 (c)(1),
(2) Date: Jun. 15, 2022

(87) PCT Pub. No.: WO2021/142717
PCT Pub. Date: Jul. 22, 2021

(65) Prior Publication Data
US 2023/0058086 A1 Feb. 23, 2023

(51) Int. Cl.
*B60W 60/00* (2020.01)
*H04W 4/44* (2018.01)
*H04W 4/46* (2018.01)

(52) U.S. Cl.
CPC ............ *B60W 60/001* (2020.02); *H04W 4/44* (2018.02); *H04W 4/46* (2018.02);
(Continued)

(58) Field of Classification Search
CPC ........ B60W 60/001; H04W 4/44; H04W 4/46
See application file for complete search history.

(56) References Cited

U.S. PATENT DOCUMENTS 7,994,902 B2 8/2011 Avery et al.
9,550,528 B1 1/2017 Hakeem et al.
(Continued)

FOREIGN PATENT DOCUMENTS

CN 106515738 A 3/2017
CN 106891888 A 6/2017
(Continued)

OTHER PUBLICATIONS

Supplementary European Search Report—EP20914097—Search Authority—The Hague—May 15, 2023.
(Continued)

*Primary Examiner* — Luke Huynh
(74) *Attorney, Agent, or Firm* — Procopio, Cory, Hargreaves & Savitch LLP

(57) ABSTRACT

A user equipment (UE) in a vehicle may transmit to another vehicle an inter-vehicle message with a driving maneuver request for a driving maneuver to be executed by the vehicle. The inter-vehicle message may include one or more estimated parameters, such as temporal, spatial, or trajectory parameters, for the driving maneuver. The inter-vehicle message may include further includes an indication of an estimation accuracy for the one or more estimated parameters. A UE in a vehicle that receives the inter-vehicle message may determine whether to grant, reject, or submit a counter-proposal to the request based at least in part on the estimated parameters and the indication of the estimation accuracy for the estimated parameters. A response to the maneuver request may be transmitted to the requesting vehicle that grants, rejects, or provides a counter proposal to the maneuver request.

40 Claims, 7 Drawing Sheets

(52) U.S. Cl.
CPC .............. *B60W 2554/4041* (2020.02); *B60W 2554/802* (2020.02); *B60W 2556/65* (2020.02)

(56) References Cited

U.S. PATENT DOCUMENTS

| | | | |
|---|---|---|---|
| 10,089,876 B1 | 10/2018 | Ramasamy et al. | |
| 11,153,721 B2 * | 10/2021 | Graefe ...................... | G08G 1/04 |
| 2016/0071418 A1 | 3/2016 | Oshida et al. | |
| 2016/0330394 A1 * | 11/2016 | Shahraray ............. | H04W 4/021 |
| 2017/0212527 A1 | 7/2017 | Park | |
| 2017/0259819 A1 | 9/2017 | Takeda | |
| 2018/0284810 A1 | 10/2018 | Strunck et al. | |
| 2019/0072965 A1 | 3/2019 | Zhang et al. | |
| 2019/0098471 A1 * | 3/2019 | Rech ........................ | G08G 1/22 |
| 2020/0055515 A1 * | 2/2020 | Herman ................. | G06V 20/58 |

FOREIGN PATENT DOCUMENTS

| | | |
|---|---|---|
| CN | 107054367 A | 8/2017 |
| CN | 107274720 A | 10/2017 |
| CN | 108352112 A | 7/2018 |
| JP | H11144185 A | 5/1999 |
| JP | 2010272080 A | 12/2010 |
| JP | 2017117186 A | 6/2017 |
| JP | 2017165153 A | 9/2017 |
| JP | 2018534692 A | 11/2018 |
| JP | 2018534693 A | 11/2018 |
| KR | 20190098093 A | 8/2019 |
| KR | 20210028971 A | 3/2021 |
| TW | 201924432 A | 6/2019 |
| WO | 2017002441 A1 | 1/2017 |
| WO | 2019232355 A1 | 12/2019 |

OTHER PUBLICATIONS

International Search Report and Written Opinion—PCT/CN2020/072495—ISA/EPO—Oct. 12, 2020.
Taiwan Search Report—TW109143299—TIPO—Jul. 2, 2024.

* cited by examiner

300

102    302    306

304

106

340

306

$D_T$    $D_L$ 304    102    342

106

370

306

304    102

106

Figures 6, 7:
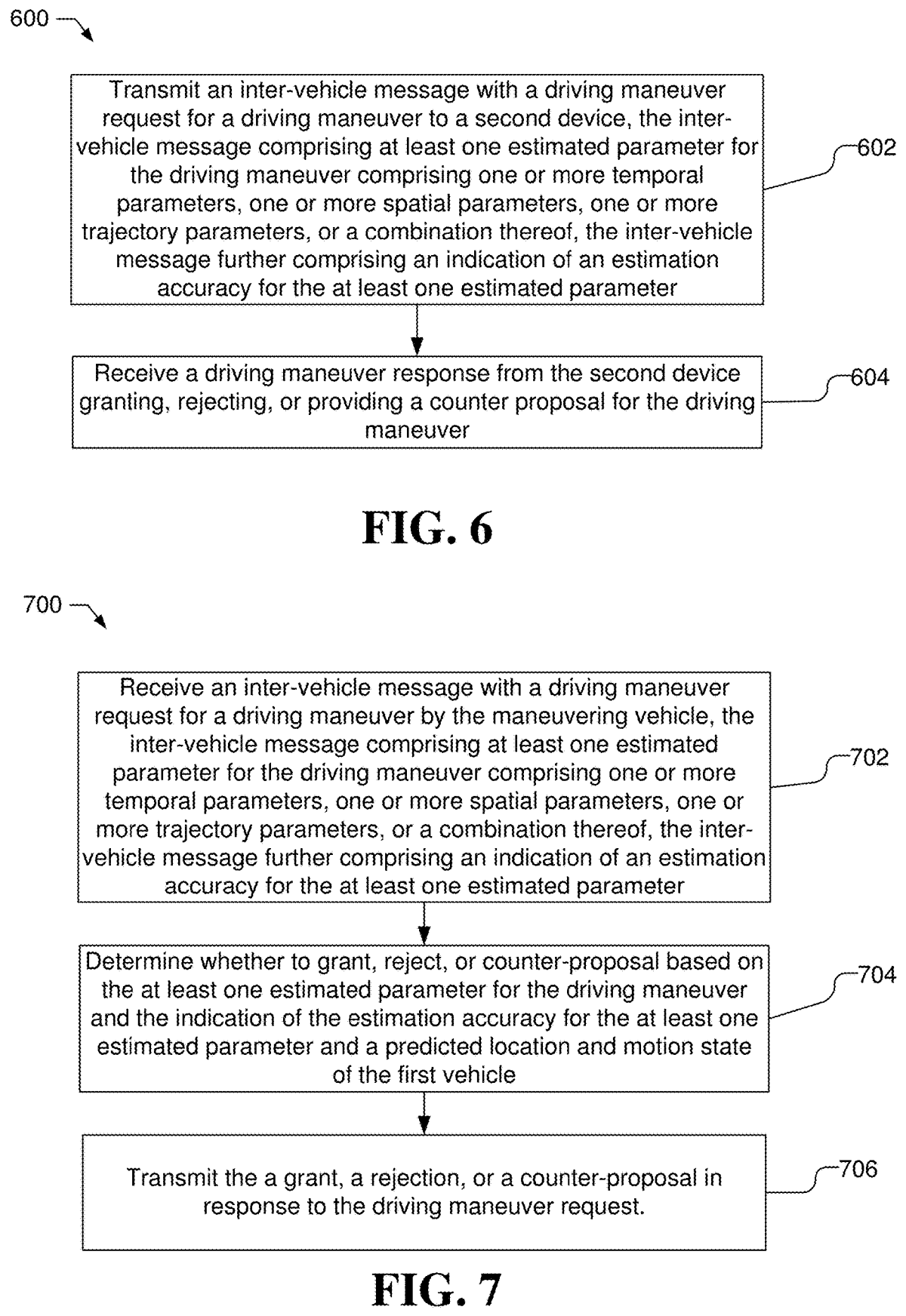

600 ⟍

| Transmit an inter-vehicle message with a driving maneuver request for a driving maneuver to a second device, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter |
|---|

602

| Receive a driving maneuver response from the second device granting, rejecting, or providing a counter proposal for the driving maneuver |
|---|

| Receive an inter-vehicle message with a driving maneuver request for a driving maneuver by the maneuvering vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter |
|---|

702

| Determine whether to grant, reject, or counter-proposal based on the at least one estimated parameter for the driving maneuver and the indication of the estimation accuracy for the at least one estimated parameter and a predicted location and motion state of the first vehicle |
|---|

704

| Transmit the a grant, a rejection, or a counter-proposal in response to the driving maneuver request. |
|---|

VEHICLE MANEUVER ESTIMATION ACCURACY CONVEYANCE

CROSS REFERENCE TO RELATED APPLICATIONS

This application is a National Stage Entry filed under 35 U.S.C. 371 of PCT/CN2020/072495, filed on Jan. 16, 2020, entitled "VEHICLE MANEUVER ESTIMATION ACCURACY CONVEYANCE," which is assigned to the assignee hereof and is expressly incorporated herein by reference in its entirety.

BACKGROUND

Background Field

The subject matter disclosed herein relates to wireless communications systems, and more particularly to methods and apparatuses for vehicle maneuver exchange in a wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

Coordinated or automated driving requires communications between vehicles, which may be direct or indirect, e.g., via an infrastructure component such as a road side unit (RSU). Inter-vehicle communications, for example, may be used to negotiate maneuvers necessary for automated driving. The inter-vehicle communications used to negotiate maneuvers may provide a current state and a planned (future) intent of a vehicle. The message exchange during these communications, however, necessarily requires time, during which conditions of either the initiating vehicle, the responding vehicle or both may change.

SUMMARY

A user equipment (UE) in a vehicle may transmit to another vehicle an inter-vehicle message with a driving maneuver request for a driving maneuver to be executed by the vehicle. The inter-vehicle message may include one or more estimated parameters, such as temporal, spatial, or trajectory parameters, for the driving maneuver. The inter-vehicle message may include further includes an indication of an estimation accuracy for the one or more estimated parameters. A UE in a vehicle that receives the inter-vehicle message may determine whether to grant, reject, or submit a counter-proposal to the request based at least in part on the estimated parameters and the indication of the estimation accuracy for the estimated parameters. A response to the maneuver request may be transmitted to the requesting vehicle that grants, rejects, or provides a counter proposal to the maneuver request.

In one implementation, a method of performing information exchange for a driving maneuver for a first vehicle, the method performed by a Vehicle-to-Everything (V2X) entity comprising one of a first device in the first vehicle or a roadside unit (RSU) in communication with the first device. includes transmitting an inter-vehicle message with a driving maneuver request for a driving maneuver to a second device in a second vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter; and receiving a driving maneuver response from the second device granting, rejecting, or providing a counter proposal for the driving maneuver.

In one implementation, Vehicle-to-Everything (V2X) entity comprising one of a first device in a first vehicle or a roadside unit (RSU) in communication with the first device configured to perform information exchange for a driving maneuver to be performed by a first vehicle includes a wireless transceiver configured to wireles sly communicate with devices; at least one memory; and at least one processor coupled to the wireless transceiver and the at least one memory, the at least one processor configured to: transmit, via the wireless transceiver, an inter-vehicle message with a driving maneuver request for a driving maneuver to a second device, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter; and receive, via the wireless transceiver, a driving maneuver response from the second device granting, rejecting, or providing a counter proposal for the driving maneuver.

In one implementation, a method of performing information exchange for a driving maneuver to be executed by a maneuvering vehicle, the method performed by a Vehicle-to-Everything (V2X) entity comprising one of a first device in the first vehicle or a roadside unit (RSU) in communication with the first device, includes receiving an inter-vehicle message with a driving maneuver request for a driving maneuver by the maneuvering vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter; determining whether to grant, reject, or counter-proposal based on the at least one estimated parameter for the driving maneuver and the indication of the estimation accuracy for the at least one estimated parameter and a predicted location and motion state of the first vehicle; and transmitting a grant, a rejection, or a counter-proposal in response to the driving maneuver request.

In one implementation, A Vehicle-to-Everything (V2X) entity configured to perform information exchange for a driving maneuver to be executed by a maneuvering vehicle, the V2X entity comprising one of a first device in a first vehicle or a roadside unit (RSU) in communication with the first device, includes a wireless transceiver configured to wirelessly communicate with devices; at least one memory; and at least one processor coupled to the wireless transceiver and the at least one memory, the at least one processor configured to: receive, via the wireless transceiver, an inter-vehicle message with a driving maneuver request for a driving maneuver by the maneuvering vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter; determine whether to grant, reject, or counter-proposal based on the at least one estimated parameter for the driving maneuver and the indication of the estimation accuracy for the at least one estimated parameter and a predicted location and motion state of the first vehicle; and transmit, via the wireless transceiver, a grant, a rejection, or a counter-proposal in response to the driving maneuver request.

BRIEF DESCRIPTION OF THE DRAWING

Non-limiting and non-exhaustive aspects are described with reference to the following figures, wherein like reference numerals refer to like parts throughout the various figures unless otherwise specified.

FIG. 6 is a flow chart illustrating a method of performing information exchange for a driving maneuver by a device in a vehicle.

FIG. 7 is a flow chart illustrating a method of performing information exchange for a driving maneuver to be executed by a maneuvering vehicle, the method performed by a device in a different vehicle.

DETAILED DESCRIPTION

Figure 1:
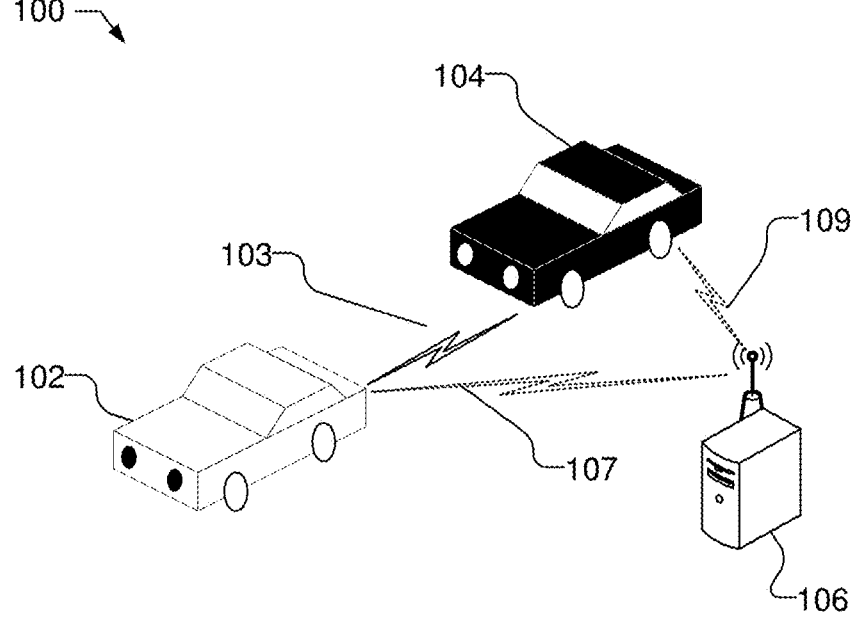
FIG. 1 illustrates a wireless communication system in which a user equipment (UE) within a vehicle is in wireless communications with other entities in the wireless communication system.

Inter-vehicle communications may be used, for example, for coordinated maneuvers used in automated driving. The inter-vehicle communications may be direct, e.g., vehicle to vehicle, or may be indirect, e.g., via an infrastructure component such as a road side unit (RSU). The inter-vehicle communications may include messaged and information elements (IEs) with which an initiating vehicle may provide, e.g., a request for a coordinated driving maneuver in which a response is expected or simply information with respect to a maneuver that the initiating vehicle intends to perform.

Application layer messages and IEs to support coordinated driving are being defined by various standards development organizations. For example, Society of Automotive Engineers (SAE) is preparing work item J3186 Maneuver Sharing and Coordinating Service and J2945/6 Performance Requirements for Cooperative Adaptive Cruise Control and Platooning. In China, Baidu has initiated a Phase 3 message definition effort for coordinated driving. Such messages are prerequisites for automated driving, which require vehicles to negotiate maneuvers by exchanging a current state and planned (future) intent.

In general, a vehicle planning a maneuver, or an infrastructure component (RSU) planning a maneuver on behalf of a vehicle, provides a maneuver start and stop time, start and stop location, and in some cases maneuver trajectory. For example, a lane change requires specification of when a vehicle will begin to enter the target lane, and when the vehicle will have completed the lane change. Similarly, a vehicle approaching a non-signalized intersection with intent to turn left, may include in its messaging when it will arrive at the intersection, when it will initiate the left turn and the time duration required to execute the left turn.

The inter-vehicle message exchange required to inform other vehicles of an intended driving maneuver or to negotiate a cooperative maneuverer results in time transpiring between the initial request, the response received if any, and the initiation of the maneuver. During the transpiring of the time, conditions for the initiating vehicle, the responding vehicle, or both may change.

The ability of a vehicle or RSU to determine temporal and spatial parameters (e.g., start/stop time, start/stop location, or trajectory) of an intended maneuver is limited by factors such as sensor input, knowledge of road conditions, and knowledge of other road users and their intended maneuvers. The further in advance that a maneuver is planned, the greater the possibility for changes in external factors, or in vehicle internal conditions and, consequently, the less accurate the estimates of the temporal and spatial parameters will be.

To enable more effective maneuver negotiations, maneuver requests may include an accuracy estimate associated with each proposed maneuver. In one implementation, a set of application-layer information elements (IEs) delineating the accuracy of estimated parameters for planned maneuver may be used in coordinated driving. For example, an estimation of the accuracy of any of the estimated temporal, spatial, and trajectory parameters may be provided to assist in the maneuver negotiations. The inclusion of an estimation accuracy for the estimated maneuver parameters in the inter-vehicle messages with other vehicles or RSUs improves the ability successfully plan and negotiate coordinated maneuvers by incorporating the appropriate margins of error.

FIG. 1 illustrates a wireless communication system 100 in which a first vehicle with a first wireless device, e.g., user equipment (UE) 102 located within the vehicle, referred to herein sometimes as vehicle 102, is in wireless communications with another UE 104, illustrated as a vehicle in the wireless communication system 100. The UE 102 may comprise, but is not limited to, an on board unit (OBU), a vehicle or subsystem thereof, or various other communication devices. The UEs 102 and 104 function and provide communications on behalf of the vehicles and, accordingly, may be sometimes referred to herein as vehicles 102 and 104. As illustrated, the vehicle 102 may directly communicate with vehicle 104 via communication link 103. In other implementations, vehicle 102 may indirectly communicate with vehicle 104 via communication links 107 and 109 through a road side unit (RSU) 106 or other an infrastructure entity, such as a base station in a Radio Access Network (RAN), such as an evolved Node B (eNB) or next generation evolved Node B (ng-eNB) in LTE wireless access and/or evolved LTE (eLTE) wireless access or a NR Node B (gNB)

in Fifth Generation (5G) wireless access, or a user equipment (UE). The communications may use cellular vehicle-to-everything (CV2X), e.g., defined by 3rd Generation Partnership Project (3GPP), and includes vehicle-to-vehicle (V2V), vehicle-to-infrastructure (V2I), and vehicle-to-pedestrian (V2P) communications that is independent of a cellular network, as well as network communications (V2N) in traditional mobile broadband licensed spectrum. Other types of communications, such as dedicated short range communications (DSRC), may be used if desired.

A road side unit (RSU) is a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The vehicles 102, 104 and RSU 106 may communicate with additional entities, such as additional vehicles, RSUs or pedestrians (not shown) using direct or indirect communication links.

The wireless communication may be over vehicle-to-vehicle or vehicle-to-infrastructure wireless communications, e.g., Proximity-based Services (ProSe) Direction Communication (PC5) reference point as defined by 3GPP, and may use wireless communications under IEEE 1609, Wireless Access in Vehicular Environments (WAVE), Intelligent Transport Systems (ITS), and IEEE 802.11p or other wireless connections between entities.

Coordinated driving maneuvers between vehicles require predictions of future vehicle locations and motion states. The accuracy of each prediction is a function of vehicle-internal and vehicle-external parameters. The further in time that a maneuver is requested, the less accurate the predicted parameter values will be. Prediction accuracy may be further reduced in environments that include vehicles that at are not V2X enabled. The accuracy to which a V2X-capable vehicle is able to predict certain future parameters, such as the start time of a maneuver, may diminish the further in advance the maneuver is planned. External and internal factors may affect the planned motion of the vehicle. As an example, a road impairment (e.g., pothole, slipper conditions, etc.), not detected when the maneuver was planned may modify the velocity of the vehicle. Similarly, the actions of other vehicles may affect the motion of the vehicle. If all nearby vehicles are V2X-capable, all vehicles may exchange current and planned motion states via V2X messaging, which may remove ambiguity in predicted parameters for a planned maneuver, at least with respect to motion of other vehicles. However, non-V2X vehicles cannot convey their planned motion state, and as a result, they may move in such a way as to impact the planned maneuver of the vehicle.

Vehicles participating in maneuver negotiations that receive a maneuver proposal determine whether to grant, reject, or counter-propose maneuvers based on the predicted location and motion state received from the proposing vehicle, and their own predicted location and motion state. Knowledge of the accuracy of the predicted location and motion states for received maneuver proposals is useful to enable the receiving vehicles to determine how to respond.

Figure 2A:
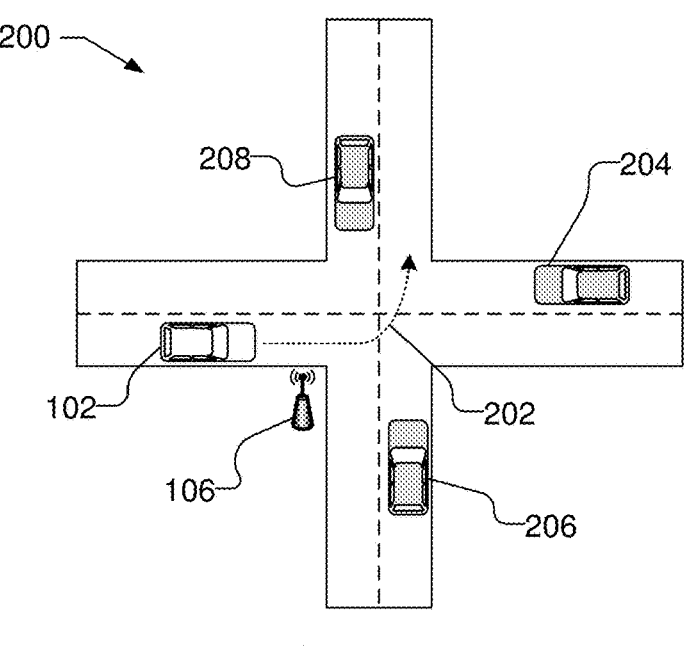
FIGS. 2A and 2B illustrate different distances at which a vehicle may initiate an inter-vehicle message exchange for an intended left hand turn maneuver and illustrate how estimated temporal parameters for a maneuver may vary.
Figure 2B:
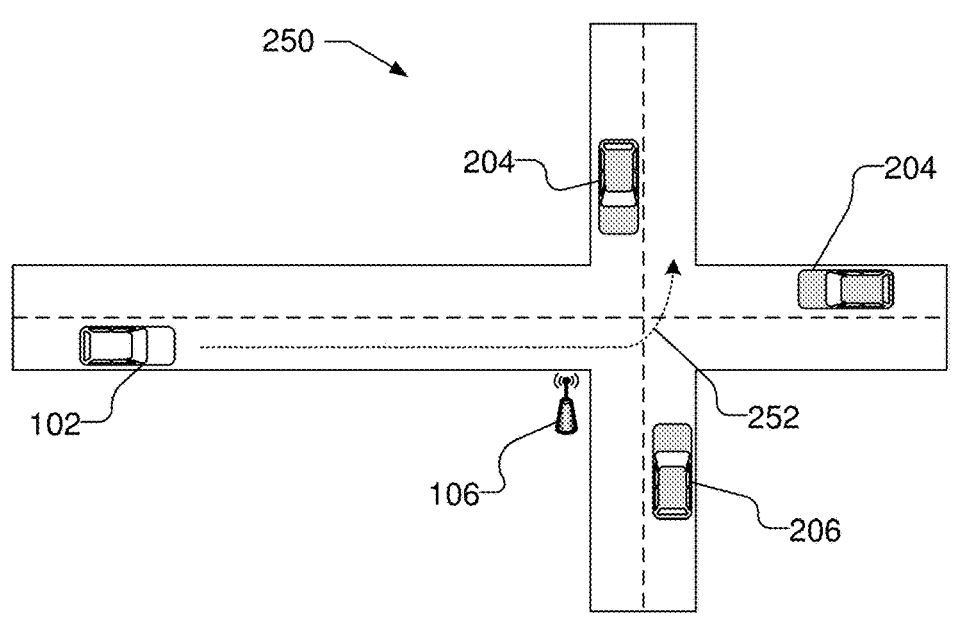

FIGS. 2A and 2B are diagrams 200 and 250 illustrating different distances at which vehicle may initiate an inter-vehicle message exchange for an intended left hand turn maneuver through an intersection, as illustrated by arrows 202 and 252 respectively, and how estimated temporal parameters for a driving maneuver may vary. Vehicle 102 may engage with vehicle 204 in an inter-vehicle negotiation directly or indirectly through an intermediary element, such as RSU 106, so that the left hand turn may be performed safely. In some implementations, the RSU 106 may initiate the inter-vehicle message exchange. The vehicle 102 (or RSU 106) may also initiate an inter-vehicle message exchange with any other affected vehicles, such as vehicles 206 and 208 to safely perform the left hand turn maneuver, e.g., if the intersection is uncontrolled.

Coordinated driving maneuvers between vehicles 102 and 204, for example, require inter-vehicle negotiation. During the maneuver negotiation, the vehicle 102 may provide a maneuver message to vehicles 204, 206, and 208 indicating one or more estimated parameters for the driving maneuver. For example, the estimated parameters may include an estimated time of arrival at the intersection and a traversal time. The estimated parameters may include one or more temporal, spatial, or trajectory parameters or a combination thereof, as well as an indication of the estimation accuracy associated with each of the estimated parameters.

As illustrated in FIGS. 2A and 2B, the vehicle 102 in diagram 200 is significantly closer to the intersection than the vehicle 102 in diagram 250, and thus, the initiation of the driving maneuver is closer in time in diagram 200 than diagram 250. While the same estimated parameters are provided in the maneuver message for the left hand turn in diagram 200 and diagram 250, the accuracy of estimated parameters for the maneuver, e.g., an estimated maneuver start time, is likely to be much greater if the maneuver request is transmitted from vehicle 102 in diagram 200 (FIG. 2A) than in diagram 250 (FIG. 2B), e.g., as fewer intervening events are likely to occur before the driving maneuver is executed. Knowledge of the accuracy of the estimated parameters is useful to the vehicles 204, 206, and 208 to determine whether to accept, reject or counter-propose a maneuver.

Figures 3A, 3B, 3C:
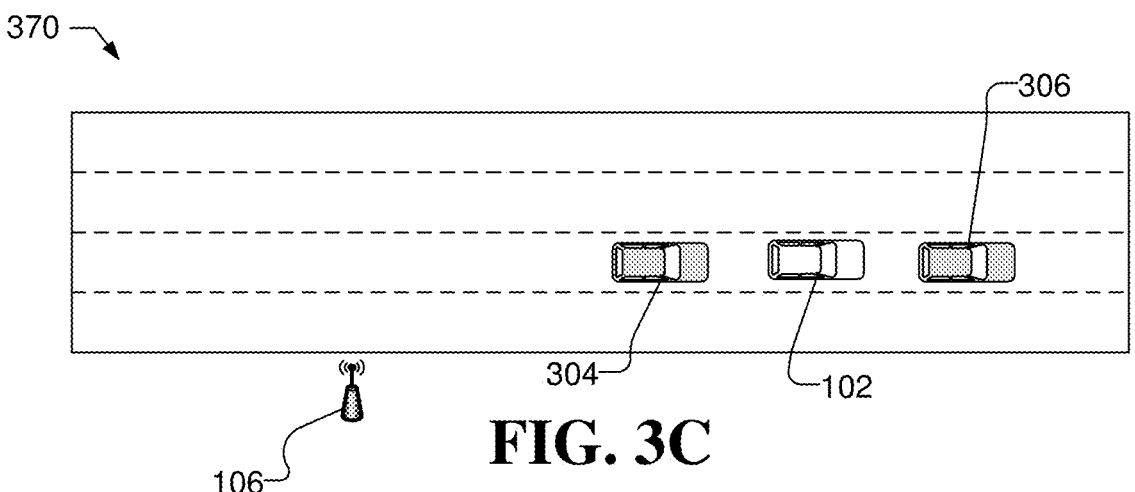
FIGS. 3A, 3B, and 3C illustrate the execution of a lane change maneuver by a vehicle and illustrate how estimated temporal and spatial parameters for a maneuver may vary.

FIGS. 3A, 3B, and 3C are diagrams 300, 340, and 370, respectively, illustrating a lane change maneuver executed by vehicle 102 and illustrate how estimated temporal and spatial parameters for a maneuver may vary. FIG. 3A illustrates a position of the vehicle 102 when the vehicle 102 may initiate an inter-vehicle message exchange for an intended lane change maneuver, illustrated by arrow 302. The vehicle 102 may engage with vehicle 304 and 306 in an inter-vehicle negotiation directly or indirectly through an intermediary element, such as RSU 106, so that the lane change may be performed safely. In some implementations, the RSU 106 may initiate the inter-vehicle message exchange. The vehicle 102, for example, may provide a maneuver message to vehicles 304 and 306 indicating one or more estimated parameters for the driving maneuver. The estimated parameters, for example, may include one or more temporal, spatial, or trajectory parameters or a combination thereof, as well as an estimation of the accuracy for the estimated parameters. For example, the vehicle 102 may transmit estimates of the maneuver (lane change) start time and a start time estimation accuracy; the maneuver (lane change) stop time and a start time estimation accuracy; a start time longitudinal distance to a trailing vehicle 304 and a longitudinal distance to a trailing vehicle accuracy; and a start time longitudinal distance to a leading vehicle 306 and a longitudinal distance to a leading vehicle accuracy.

FIG. 3B illustrates the initiation of the lane change maneuver by the vehicle 102, illustrated by arrow 342. At the time of the lane change maneuver (as illustrated in FIG. 3B), the longitudinal distance to the trailing vehicle 304 ($D_T$) and the start time longitudinal distance to a leading vehicle 306 ($D_L$) as well as the actual start time and the estimated stop time of the lane change maneuver are known with greater accuracy than could be known at the time of the initiation of the inter-vehicle message exchange in FIG. 3A. Thus, if the vehicle 102 provides a maneuver message to the vehicles 304 and 306 with the estimated parameters (or an update of the estimated parameters) for the maneuver at the time illustrated in FIG. 3B, the estimation of the accuracy for the estimated parameters will be much greater than that provided with the initiation of the inter-vehicle negotiation in FIG. 3A.

FIG. 3C illustrates the completion of the lane change maneuver by the vehicle 102. At the time of the completion of the lane change maneuver, the stop time of the lane change maneuver is known with greater accuracy than could be known at the time of the initiation of the inter-vehicle message exchange in FIG. 3A.

During the maneuver negotiation initiated for the lane change in FIG. 3A, it is useful for the vehicles 304 and 306 to receive an indication of the accuracy of the estimated maneuver parameters. The inclusion of an indication of the estimation accuracy for the estimated maneuver parameters in the inter-vehicle messages improves the ability of the vehicles 304 and 306 to successfully plan and negotiate the coordinated lane change maneuver by incorporating the appropriate margins of error, e.g., slowing down, speeding up, or rejecting the maneuver request or providing a counter proposal.

The estimated parameters and estimation of the accuracy of the estimated parameters may be included in an application-layer information element (IE), such as those defined by Society of Automotive Engineers (SAE). Tables 1 and 2, for example, illustrate data fields, data elements, and descriptions suitable for application-layer standards for the estimation accuracy for time and distance parameters, respectively, for a driving maneuver, such as the lane change illustrated in FIGS. 3A, 3B, and 3C.

TABLE 1

| Data Field | Description | Data Element |
|---|---|---|
| Maneuver Time Accuracy | Start Time Accuracy | DE_TimeAccuracy |
| | Stop Time Accuracy | DE_TimeAccuracy |

TABLE 2

| Data Field | Description | Data Element |
|---|---|---|
| Longitudinal Distance Accuracy | Leading Vehicle Distance Accuracy | DE_DistAccuracy |
| | Trailing Vehicle Distance Accuracy | DE_DistAccuracy |

Figure 4:
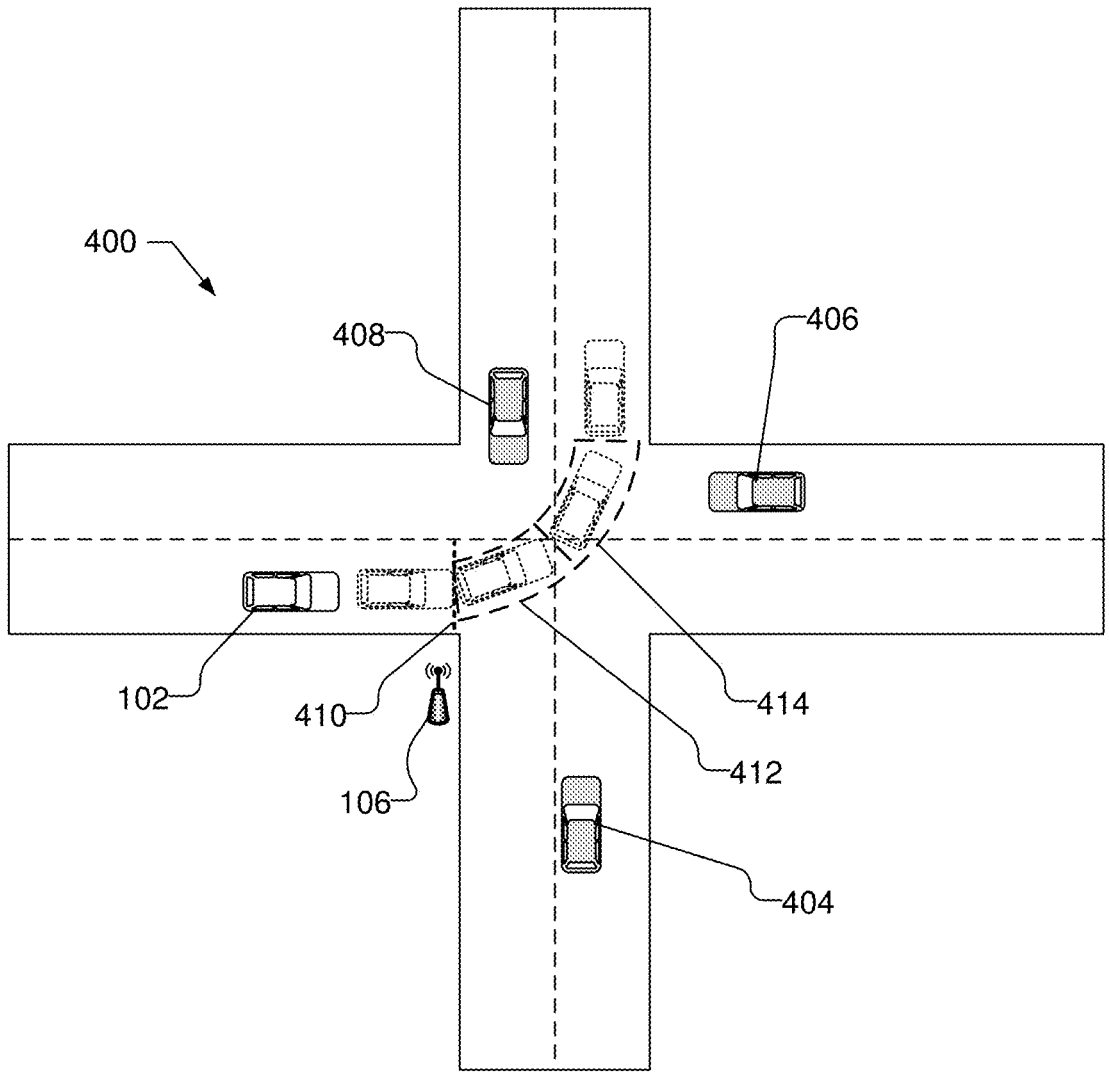
FIG. 4 illustrates an intended intersection traversal by a vehicle while performing a left hand turn maneuver and illustrate how estimated trajectory parameters for a maneuver may vary.

FIG. 4 is a diagram 400 illustrating an intended intersection traversal by vehicle 102 while performing a left hand turn maneuver and illustrate how estimated trajectory parameters for a maneuver may vary. Vehicle 102 is illustrated as approaching the intersection with the intention of turning left. Vehicle 102 may transmit its intention to turn left to affected vehicles, e.g., one or more vehicles 404, 406, and 408, in an inter-vehicle negotiation directly or indirectly through an intermediary element, such as RSU 106, so that the intersection traversal may be performed safely. In some implementations, the RSU 106 may initiate the inter-vehicle message exchange. The path of vehicle 102 through the intersection, including at an intersection stop line 410 and through intersection trajectory segments 412 and 414, is illustrated with dotted lines.

The maneuver message transmitted by vehicle 102 to affected vehicles, 404, 406, and 408 may include one or more estimated parameters for the driving maneuver, such as temporal, spatial, or trajectory parameters, as well as an indication of the estimation accuracy associated with each of the estimated parameters. By way of example, vehicle 102 may provide an estimated time of arrival (ETA) to the intersection stop line 410, as well as an ETA and estimated time to pass (ETP) for each intended intersection trajectory segment 412 and 414. Each ETA and ETP, e.g., for the stop line 410 and intersection trajectory segments 412 and 414, may include an estimation accuracy. For estimated maneuver parameters, e.g., the ETA and ETP values, that are further out in time, the associated estimation accuracy may be reduced. In some implementations, a value provided as an indication of the estimation accuracy may increase as the estimation accuracy is reduced, e.g., lower estimation accuracy values indicate greater accuracy. For example, as illustrated in FIG. 4, vehicle 102 is closer in time to stopping at the intersection stop line 410 than passing from intersection trajectory segment 414, and thus, the estimated ETA for intersection stop line 410 has greater accuracy (and in some implementations, a lower estimation accuracy value) than the estimated ETP for the intersection trajectory segment 414.

Table 3, for example, illustrates data fields, data elements, and descriptions suitable for application-layer standards for the estimation accuracy for trajectory parameters for a driving maneuver, such as the intersection traversal illustrated in FIG. 4.

TABLE 3

| Data Field | Description | Data Element |
|---|---|---|
| Maneuver Time Accuracy | ETA Accuracy | DE_TimeAccuracy |
| | ETP Accuracy | DE_TimeAccuracy |

Table 4 illustrates possible definitions of data elements, e.g., related to temporal accuracy and distance accuracy, e.g., illustrated in Tables 1, 2, or 3.

TABLE 4

| DE_TimeAccuracy | DE_DistanceAccuracy |
|---|---|
| TimeAccuracy ::= ENUMERATED { unavailable (0), -- Not Equipped or unavailable | DistanceAccuracy ::= ENUMERATED { unavailable (0), -- B'0000 Not Equipped or unavailable |
| prec1ms (1), -- 0.001 sec | elev-500-00 (1), -- 500 m |
| prec5ms (2), -- 0.05 sec | elev-200-00 (2), -- 200 m |
| prec10ms (3), -- 0.01 sec | elev-100-00 (3), -- 100 m |
| prec50ms (4), -- 0.05 sec | elev-050-00 (4), -- 50 m |
| prec100ms (5), -- 0.1 sec | elev-020-00 (5), -- 20 m |
| prec250ms (6), -- 0.25 sec | elev-010-00 (6), -- 10 m |

TABLE 4-continued

| DE__TimeAccuracy | DE__DistanceAccuracy |
| --- | --- |
| prec500ms (7) -- 0.5 sec | elev-005-00 (7), -- 5 m |
| prec750ms (8) -- 0.75 sec | elev-002-00 (8), -- 2 m |
| prec1s (9) -- 1 sec | elev-001-00 (9), -- 1 m |
| prec2ms (10) -- 2 sec | elev-000-50 (10), -- 50 cm |
| prec5s (11) -- 5 sec | elev-000-20 (11), -- 20 cm |
| prec10s (12) -- 10 sec | elev-000-10 (12), -- 10 cm |
| prec10s (13) -- 20 sec | elev-000-05 (13), -- 5 cm |
| prec10s (14) -- 30 sec | elev-000-02 (14), -- 2 cm |
| prec10s (15) -- 60 sec | elev-000-01 (15) -- 1 cm |
| }-- Encoded as a 4 bit value | } -- Encoded as a 4 bit value |

The IEs definitions illustrated in Tables 1-4 may be applied to application-layer messages, such as those defined by (SAE) and may be applicable to inter-vehicle messages for any coordinated maneuver requiring a time or distance (spatial) estimate.

Figure 5:
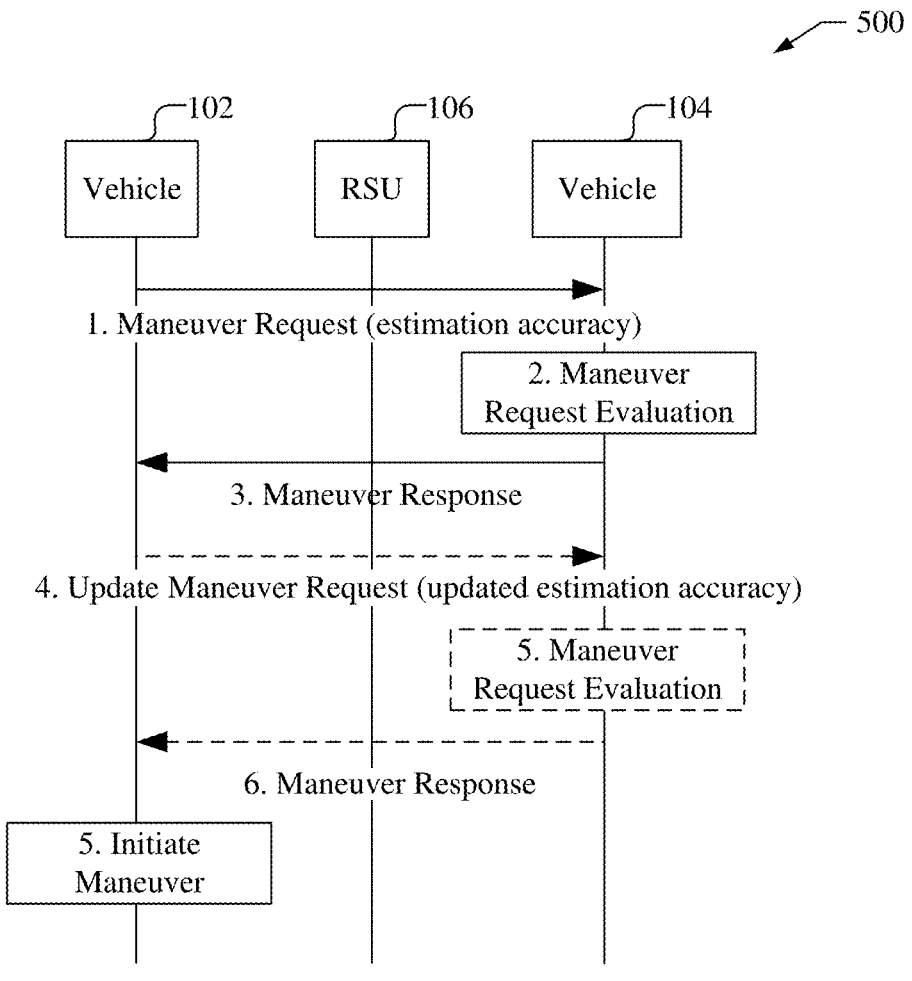
FIG. 5 is a signal flow illustrating of an inter-vehicle message exchange between vehicles for an intended driving maneuver in which an estimation accuracy for each estimated parameter for the intended driving maneuver is provided.

FIG. 5 is a signal flow 500 illustrating an example of an inter-vehicle message exchange between vehicles 102 and 104 for an intended driving maneuver in which an estimation accuracy for each estimated parameter for the intended driving maneuver is provided.

At stage 1 of FIG. 5, the vehicle 102 transmits an inter-vehicle message with a driving maneuver request for a driving maneuver that is received by vehicle 104. Vehicle 102 may transmit the maneuver request directly to the vehicle 104 or through an intermediary element, such as RSU 106. In some implementations, the RSU 106 may initiate the inter-vehicle message exchange, for example, the RSU 106 may receive sensor information from one or more vehicles, and may use its own sensor information to determine a driving maneuver for a vehicle and initiate a maneuver request. The maneuver request includes at least one estimated parameter for the driving maneuver, e.g., one or more temporal parameters, one or more spatial parameters, one or more trajectory parameters, or a combination thereof. The maneuver request further includes an indication of the estimation accuracy associated with each of the estimated parameters for the driving maneuver.

At stage 2, vehicle 104 may perform a maneuver request evaluation, e.g., during it is determined whether to grant the maneuver request, reject the maneuver request, or provide a counter-proposal to the maneuver request based on one or more estimated parameters and the indication of the estimation accuracy for the estimated parameters provided in the maneuver request in stage 1, as well as a predicted location and motion state of the vehicle 104.

At stage 3, vehicle 104 transmits a maneuver response message to the vehicle 102, that grants, rejects or provides a counter-proposal to the maneuver request from stage 1. If the maneuver response message rejects the maneuver request from stage 1, vehicle 102 may initiate a new maneuver request. If the maneuver response message provides a counter-proposal to the maneuver request from stage 1, vehicle 102 may evaluate the counter-proposal and respond or may initiate a new maneuver request. If the maneuver response message accepts the maneuver request from stage 1, vehicle 102 may proceed with the driving maneuver, as illustrated in FIG. 5.

At stage 4, vehicle 102 may optionally transmits an inter-vehicle message with an update to the maneuver request. The update to the maneuver request is closer in time to the proposed driving maneuver, and thus, updated estimated parameters for the driving maneuver may be provided, along with an indication of the estimation accuracy associated with each of the updated estimated parameters.

At stage 5, if optional stage 4 is performed, vehicle 104 may perform an evaluation of the updated maneuver request from stage 4, similar to the evaluation discussed in stage 2.

At stage 6, if optional stages 4 and 5 are performed, vehicle 104 may transmit another maneuver response message to the vehicle 102 that grants, rejects or provides a counter-proposal to the maneuver request from stage 4.

At stage 7, if the maneuver response message of stage 3 (and stage 6 if performed) accepts the proposed maneuver request of stage 1 (and stage 4 if performed), the vehicle 102 may initiate the proposed driving maneuver.

FIG. 6 is a flow chart 600 illustrating a method of performing information exchange for a driving maneuver for a first vehicle performed by a a Vehicle-to-Everything (V2X) entity comprising one of a first vehicle in a first vehicle, such as a UE in vehicle 102 or a roadside unit (RSU) in communication with the first device, such as RSU 106.

As illustrated in block 602, an inter-vehicle message with a driving maneuver request for a driving maneuver is transmitted to a second device, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter, e.g., as discussed at stages 1 and 4 in FIG. 5. At block 604, a driving maneuver response is received from the second device granting, rejecting, or providing a counter proposal for the driving maneuver, e.g., as discussed at stages 3 and 6 in FIG. 5.

In one implementation, the one or more temporal parameters comprises a start time and a stop time for the driving maneuver, and the indication of the estimation accuracy comprises a start time estimation accuracy and a stop time estimation accuracy.

In one implementation, the one or more spatial parameters comprises a start location and a stop location for the driving maneuver, and the indication of the estimation accuracy comprises a start location estimation accuracy and a stop location estimation accuracy.

In one implementation, the one or more spatial parameters comprises a start time longitudinal distance to leading vehicle and a start time longitudinal distance to trailing vehicle for the driving maneuver, and the indication of the estimation accuracy comprises a leading vehicle distance estimation accuracy and a trailing vehicle distance estimation accuracy.

In one implementation, the one or more trajectory parameters comprises an estimated time of arrival (ETA) for each intended trajectory segment and an estimated time to pass (ETP) for each intended trajectory segment for the driving maneuver, and the indication of the estimation accuracy comprises an ETA estimation accuracy for each intended trajectory segment and an ETP estimation accuracy for each intended trajectory segment.

In one implementation, the at least one estimated parameter and the indication of the estimation accuracy for the at least one estimated parameter are information elements in application-layer messages.

In one implementation, wherein the second device is in a second vehicle.

In one implementation, the V2X entity is the first device in the first vehicle and the second device is in a road side unit.

In one implementation, the inter-vehicle message is transmitted in a Device-to-Device (D2D) communication link. For example, the D2D communication link may comprise a dedicated short-range communication (DSRC), a cellular Vehicle-to-Everything (C-V2X) communication, or a 5G New Radio (NR) communication.

FIG. 7 is a flow chart 700 illustrating a method of performing information exchange for a driving maneuver to be executed by a maneuvering vehicle, such as vehicle 102 in FIG. 1, the method performed by a Vehicle-to-Everything (V2X) entity comprising one of a first device in a first vehicle, such as a UE in vehicle 104 or a roadside unit (RSU) in communication with the first device, such as RSU 106.

As illustrated in block 702, an inter-vehicle message is received with a driving maneuver request for a driving maneuver by the maneuvering vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter, e.g., as discussed at stages 1 and 4 in FIG. 5. In block 704, the first vehicle determines whether to grant, reject, or counter-proposal based on the at least one estimated parameter for the driving maneuver and the indication of the estimation accuracy for the at least one estimated parameter and a predicted location and motion state of the first vehicle, e.g., as discussed at stages 2 and 5 in FIG. 5. In block 706, the first vehicle transmits a grant, a rejection, or a counter-proposal in response to the driving maneuver request, e.g., as discussed at stages 3 and 6 in FIG. 5.

In one implementation, the one or more temporal parameters comprises a start time and a stop time for the driving maneuver, and the indication of the estimation accuracy comprises a start time estimation accuracy and a stop time estimation accuracy.

In one implementation, the one or more spatial parameters comprises a start location and a stop location for the driving maneuver, and the indication of the estimation accuracy comprises a start location estimation accuracy and a stop location estimation accuracy.

In one implementation, the one or more spatial parameters comprises a start time longitudinal distance to leading vehicle and a start time longitudinal distance to trailing vehicle for the driving maneuver, and the indication of the estimation accuracy comprises a leading vehicle distance estimation accuracy and a trailing vehicle distance estimation accuracy.

In one implementation, the one or more trajectory parameters comprises an estimated time of arrival (ETA) for each intended trajectory segment and an estimated time to pass (ETP) for each intended trajectory segment for the driving maneuver, and the indication of the estimation accuracy comprises an ETA estimation accuracy for each intended trajectory segment and an ETP estimation accuracy for each intended trajectory segment.

In one implementation, the at least one estimated parameter and the indication of the estimation accuracy for the at least one estimated parameter are information elements in application-layer messages.

In one implementation, the inter-vehicle message is received directly from a second device in the maneuvering vehicle.

In one implementation, the inter-vehicle message is received from a road side unit.

In one implementation, the inter-vehicle message is transmitted in a Device-to-Device (D2D) communication link. For example, the D2D communication link may comprise a dedicated short-range communication (DSRC), a cellular Vehicle-to-Everything (C-V2X) communication, or a 5G New Radio (NR) communication.

Figure 8:
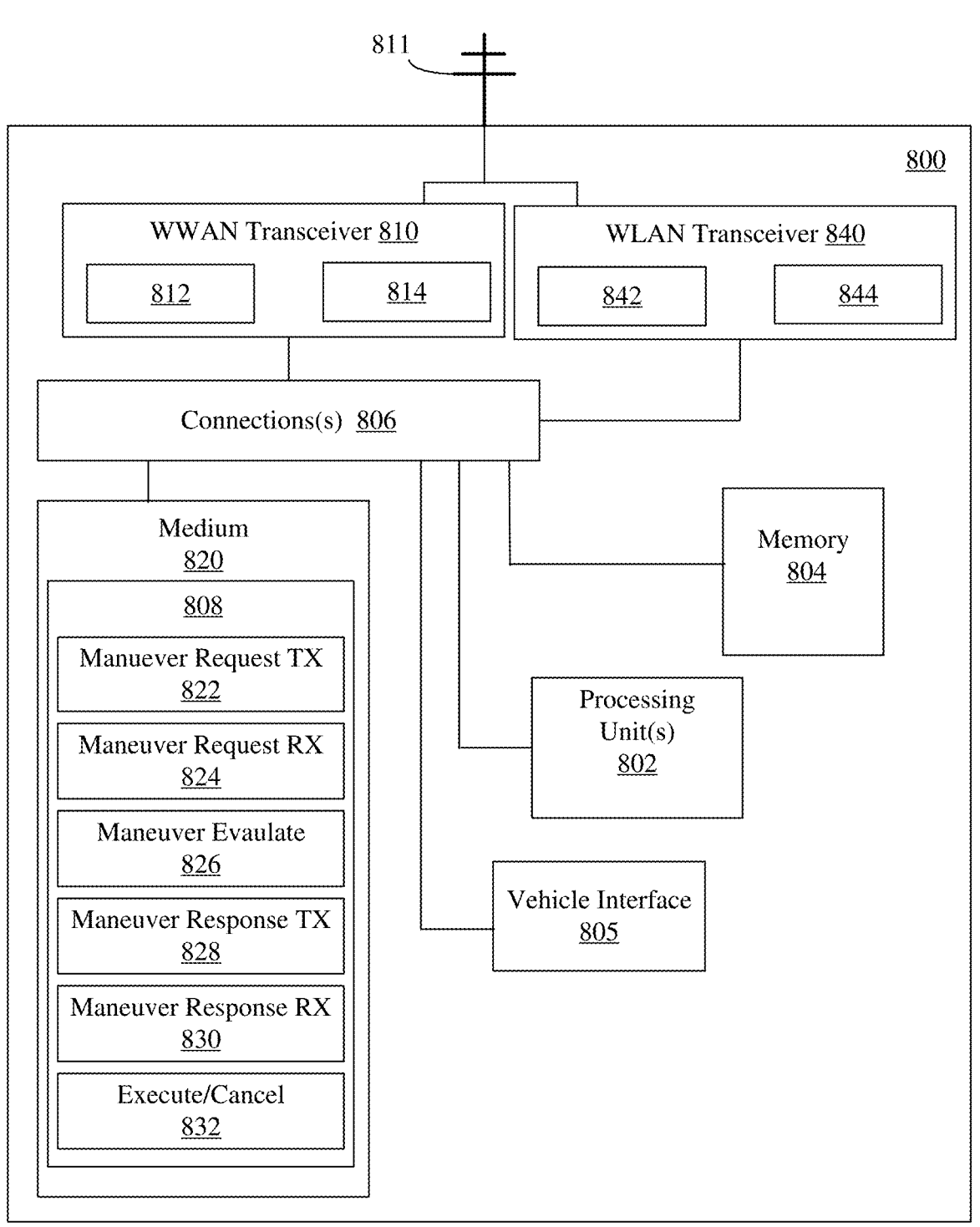
FIG. 8 is a diagram illustrating an example of a hardware implementation of a user equipment (UE) for a vehicle capable of performing information exchange for a driving maneuver.

FIG. 8 shows a schematic block diagram illustrating certain exemplary features of a V2X entity 800, which may be, e.g., a user equipment (UE) for a vehicle or a roadside unit (RSU), the V2X entity 800 capable of performing information exchange for maneuver execution by the vehicle. Where the V2X entity 800 is a UE in a vehicle, it may control the automated driving of vehicle 102 or vehicles 104, 204, 304, 404 shown in FIGS. 1-5 and may include a vehicle interface 805 with which commands are provided to the vehicle for automated driving and sensory input may be provided from the vehicle. The V2X entity 800 may, for example, include one or more processors 802, memory 804, a Wireless Wide Area Network (WWAN) transceiver 810, and a Wireless Local Area Network (WLAN) transceiver 840, which may be operatively coupled with one or more connections 806 (e.g., buses, lines, fibers, links, etc.) to non-transitory computer readable medium 820 and memory 804. The V2X entity 800 may further include additional items, which are not shown, such as a user interface that may include e.g., a display, a keypad or other input device, such as virtual keypad on the display, through which a user may interface with the user device, or a satellite positioning system receiver. In certain example implementations, all or part of V2X entity 800 may take the form of a chipset, and/or the like. Transceiver 810 may be, e.g., a cellular transceiver, and may be configured to transmit and receive inter-vehicle communications in the wireless network, as illustrated in FIGS. 1 and 2. The transceiver 810 may include a transmitter 812 enabled to transmit one or more signals over one or more types of wireless communication networks and a receiver 814 to receive one or more signals transmitted over the one or more types of wireless communication networks. Transceiver 840 may be, e.g., a short range transceiver, and may be configured to transmit and receive inter-vehicle communications in the wireless network, as illustrated in FIGS. 1 and 2. The transceiver 840 may include a transmitter 842 enabled to transmit one or more signals over one or more types of wireless communication networks and a receiver 844 to receive one or more signals transmitted over the one or more types of wireless communication networks. The transceivers 810 and 840 enable the V2X entity 800 to communicate with transportation entities using D2D communication links, such as DSRC, C-V2X, or 5G NR.

In some embodiments, V2X entity 800 may include antenna 811, which may be internal or external. The antenna 811 may be used to transmit and/or receive signals processed by transceiver 810 and/or transceiver 840. In some embodiments, antenna 811 may be coupled to transceiver 810 and/or transceiver 840. In some embodiments, measurements of signals received (transmitted) by V2X entity 800 may be performed at the point of connection of the antenna 811 and transceiver 810 and/or transceiver 840. For example, the measurement point of reference for received (transmitted) RF signal measurements may be an input (output) terminal of the receivers 814, 844 (transmitters 812, 842) and an output (input) terminal of the antenna 811. In a V2X entity 800 with multiple antennas 811 or antenna arrays, the antenna connector may be viewed as a virtual point representing the aggregate output (input) of multiple antennas.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of V2X entity 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in V2X entity 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in V2X entity 800 is merely exemplary, and as such the functionality of the modules and/or data structures may be combined, separated, and/or be structured in different ways depending upon the implementation of the V2X entity 800.

The medium 820 and/or memory 804 may include a maneuver request transmit (TX) module 822 that when implemented by the one or more processors 802 configures the one or more processors 802 to generate and to cause the transceiver 810 or 840 to transmit an inter-vehicle message with a driving maneuver request for a driving maneuver to another UE in another vehicle. The inter-vehicle message includes at least one estimated parameter for the driving maneuver comprising one or more temporal parameters, one or more spatial parameters, one or more trajectory parameters, or a combination thereof and includes an indication of an estimation accuracy for the at least one estimated parameter. For example, the transceiver 810 or 840 may be configured to transmit the inter-vehicle message in a D2D communication link, such as DSRC, C-V2X, or 5GNR.

The medium 820 and/or memory 804 may include a maneuver request receive (RX) module 824 that when implemented by the one or more processors 802 configures the one or more processors 802 enable the transceiver 810 or 840 to receive an inter-vehicle message with a driving maneuver request for a driving maneuver from a UE in another vehicle. The received inter-vehicle message includes at least one estimated parameter for the driving maneuver comprising one or more temporal parameters, one or more spatial parameters, one or more trajectory parameters, or a combination thereof and includes an indication of an estimation accuracy for the at least one estimated parameter.

The medium 820 and/or memory 804 may include maneuver evaluate module 826 that when implemented by the one or more processors 802 configures the one or more processors 802 to determine whether to grant, reject, or provide a counter-proposal to a received maneuver request based on the estimated parameters for the driving maneuver and the indication of the estimation accuracy for the estimated parameters and a predicted location and motion state of the vehicle.

The medium 820 and/or memory 804 may include maneuver response TX module 828 that when implemented by the one or more processors 802 configures the one or more processors 802 to transmit a grant, a rejection, or a counter-proposal to in response to a driving maneuver request, e.g., via transceiver 810 or transceiver 840.

The medium 820 and/or memory 804 may include maneuver response RX module 830 that when implemented by the one or more processors 802 configures the one or more processors 802 to enable the transceiver 810 or transceiver 840 to receive a maneuver response message granting, rejecting, or providing a counter proposal for the driving maneuver.

The medium 820 and/or memory 804 may include an execute/cancel module 832 that when implemented by the one or more processors 802 configures the one or more processors 802 to execute or cancel the driving maneuver based on the grant, rejection or counter proposal received in the maneuver response message.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support OTDOA measurements in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

A user equipment, such as UE 800, in a vehicle that is configured to perform information exchange for a maneuver may include a means for transmitting an inter-vehicle message with a driving maneuver request for a driving maneuver to a second device in a second vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter, which may be, e.g., the wireless transceiver 810 or wireless transceiver 840 and one or more processors 802 with dedicated hardware or implementing executable code or software instructions in medium 820 and/or memory 804 such as the maneuver request TX module 822. A means for receiving a driving maneuver response from the second device granting, rejecting, or providing a counter proposal for the driving maneuver may be, e.g., the wireless transceiver 810 or wireless transceiver 840 and one or more processors 802 with dedicated hardware or implementing executable code or software instructions in medium 820 and/or memory 804 such as the maneuver response RX module 830.

A user equipment, such as UE 800, in a vehicle that is configured to perform information exchange for a maneuver to be executed by a maneuvering vehicle may include a means for receiving an inter-vehicle message with a driving maneuver request for a driving maneuver by the maneuvering vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter, which may be, e.g., the wireless transceiver 810 or wireless transceiver 840 and one or more processors 802 with dedicated hardware or implementing executable code or software instructions in medium 820 and/or memory 804 such as the maneuver request RX module 824. A means for determining whether to grant, reject, or counter-proposal based on the at least one estimated parameter for the driving maneuver and the indication of the estimation accuracy for the at least one estimated parameter and a predicted location and motion state of the first vehicle may be, e.g., the wireless transceiver 810 or wireless transceiver 840 and one or more processors 802 with dedicated hardware or implementing executable code or software instructions in medium 820 and/or memory 804 such as the maneuver evaluate module 826. A means for transmitting a grant, a rejection, or a counter-proposal in response to the driving maneuver request may be, e.g., the wireless transceiver 810 or wireless transceiver 840 and one or more processors 802 with dedicated hardware or implementing executable code or software instructions in medium 820 and/or memory 804 such as the maneuver response TX module 828.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of performing information exchange for a driving maneuver for a first vehicle, the method performed by a Vehicle-to-Everything (V2X) entity comprising one of a first device in the first vehicle or a roadside unit (RSU) in communication with the first device, the method comprising:

transmitting, to a second device, an inter-vehicle message with a driving maneuver request for a driving maneuver, associated with maneuvering the first vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter, wherein the least one estimated parameter for the driving maneuver is based in part on sensor input;

receiving a driving maneuver response from the second device granting, rejecting, or providing a counter proposal for the driving maneuver; and transmitting an updated driving maneuver request or proceeding with the driving maneuver request based on the received driving maneuver response.

2. The method of claim 1, wherein the one or more temporal parameters comprises a start time and a stop time for the driving maneuver, and wherein the indication of the estimation accuracy comprises a start time estimation accuracy and a stop time estimation accuracy.

3. The method of claim 1, wherein the one or more spatial parameters comprises a start location and a stop location for the driving maneuver, and wherein the indication of the estimation accuracy comprises a start location estimation accuracy and a stop location estimation accuracy.

4. The method of claim 1, wherein the one or more spatial parameters comprises a start time longitudinal distance to leading vehicle and a start time longitudinal distance to trailing vehicle for the driving maneuver, and wherein the indication of the estimation accuracy comprises a leading vehicle distance estimation accuracy and a trailing vehicle distance estimation accuracy.

5. The method of claim 1, wherein the one or more trajectory parameters comprises an estimated time of arrival (ETA) for each intended trajectory segment and an estimated time to pass (ETP) for each intended trajectory segment for the driving maneuver, and wherein the indication of the estimation accuracy comprises an ETA estimation accuracy for each intended trajectory segment and an ETP estimation accuracy for each intended trajectory segment.

6. The method of claim 1, wherein the at least one estimated parameter and the indication of the estimation accuracy for the at least one estimated parameter are information elements in application-layer messages.

7. The method of claim 1, wherein the second device is in a second vehicle.

8. The method of claim 1, wherein the V2X entity is the first device in the first vehicle and the second device is in a roadside unit.

9. The method of claim 1, wherein the inter-vehicle message is transmitted in a Device-to-Device (D2D) communication link.

10. The method of claim 9, wherein the D2D communication link comprises a dedicated short-range communication (DSRC), a cellular Vehicle-to-Everything (C-V2X) communication, or a 5G New Radio (NR) communication.

11. A Vehicle-to-Everything (V2X) entity comprising one of a first device in a first vehicle or a roadside unit (RSU) in communication with the first device configured to perform information exchange for a driving maneuver to be performed by a first vehicle, comprising:

a wireless transceiver configured to wirelessly communicate with devices;

at least one memory; and at least one processor coupled to the wireless transceiver and the at least one memory, the at least one processor configured to:

transmit, to a second device, via the wireless transceiver, an inter-vehicle message with a driving maneuver request for a driving maneuver associated with maneuvering the first vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter, wherein the least one estimated parameter for the driving maneuver is based in part on sensor input;

receive, via the wireless transceiver, a driving maneuver response from the second device granting, rejecting, or providing a counter proposal for the driving maneuver; and transmit an updated driving maneuver request or proceed with the driving maneuver request based on the received driving maneuver response.

12. The first device of claim 11, wherein the one or more temporal parameters comprises a start time and a stop time for the driving maneuver, and wherein the indication of the estimation accuracy comprises a start time estimation accuracy and a stop time estimation accuracy.

13. The first device of claim 11, wherein the one or more spatial parameters comprises a start location and a stop location for the driving maneuver, and wherein the indication of the estimation accuracy comprises a start location estimation accuracy and a stop location estimation accuracy.

14. The first device of claim 11, wherein the one or more spatial parameters comprises a start time longitudinal distance to leading vehicle and a start time longitudinal distance to trailing vehicle for the driving maneuver, and wherein the indication of the estimation accuracy comprises a leading vehicle distance estimation accuracy and a trailing vehicle distance estimation accuracy.

15. The first device of claim 11, wherein the one or more trajectory parameters comprises an estimated time of arrival (ETA) for each intended trajectory segment and an estimated time to pass (ETP) for each intended trajectory segment for the driving maneuver, and wherein the indication of the estimation accuracy comprises an ETA estimation accuracy for each intended trajectory segment and an ETP estimation accuracy for each intended trajectory segment.

16. The first device of claim 11, wherein the at least one estimated parameter and the indication of the estimation accuracy for the at least one estimated parameter are information elements in application-layer messages.

17. The first device of claim 11, wherein the second device is in a second vehicle.

18. The first device of claim 11, wherein the V2X entity is the first device in the first vehicle and the second device is in a roadside unit.

19. The first device of claim 11, wherein to transmit the inter-vehicle message, the at least one processor is configured to transmit the inter-vehicle message in a Device-to-Device (D2D) communication link.

20. The first device of claim 19, wherein the D2D communication link comprises a dedicated short-range communication (DSRC), a cellular Vehicle-to-Everything (C-V2X) communication, or a 5G New Radio (NR) communication.

21. A method of performing information exchange for a driving maneuver to be executed by a maneuvering vehicle, the method performed by a Vehicle-to-Everything (V2X) entity comprising one of a first device in the first vehicle or a roadside unit (RSU) in communication with the first device, the method comprising:

receiving an inter-vehicle message with a driving maneuver request for a driving maneuver by the maneuvering vehicle, the driving maneuver being associated with maneuvering the first vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter, wherein the least one estimated parameter for the driving maneuver is based in part on sensor input;

determining whether to grant, reject, or counter-proposal based on the at least one estimated parameter for the driving maneuver and the indication of the estimation accuracy for the at least one estimated parameter and a predicted location and motion state of the first vehicle; and transmitting a grant, a rejection, or a counter-proposal determined based on the driving maneuver request.

22. The method of claim 21, wherein the one or more temporal parameters comprises a start time and a stop time for the driving maneuver, and wherein the indication of the estimation accuracy comprises a start time estimation accuracy and a stop time estimation accuracy.

23. The method of claim 21, wherein the one or more spatial parameters comprises a start location and a stop location for the driving maneuver, and wherein the indication of the estimation accuracy comprises a start location estimation accuracy and a stop location estimation accuracy.

24. The method of claim 21, wherein the one or more spatial parameters comprises a start time longitudinal distance to leading vehicle and a start time longitudinal distance to trailing vehicle for the driving maneuver, and wherein the indication of the estimation accuracy comprises a leading vehicle distance estimation accuracy and a trailing vehicle distance estimation accuracy.

25. The method of claim 21, wherein the one or more trajectory parameters comprises an estimated time of arrival (ETA) for each intended trajectory segment and an estimated time to pass (ETP) for each intended trajectory segment for the driving maneuver, and wherein the indication of the estimation accuracy comprises an ETA estimation accuracy for each intended trajectory segment and an ETP estimation accuracy for each intended trajectory segment.

26. The method of claim 21, wherein the at least one estimated parameter and the indication of the estimation accuracy for the at least one estimated parameter are information elements in application-layer messages.

27. The method of claim 21, wherein the inter-vehicle message is received directly from a second device in the maneuvering vehicle.

28. The method of claim 21, wherein the inter-vehicle message is received from a roadside unit.

29. The method of claim 21, wherein the inter-vehicle message is received in a Device-to-Device (D2D) communication link.

30. The method of claim 29, wherein the D2D communication link comprises a dedicated short-range communication (DSRC), a cellular Vehicle-to-Everything (C-V2X) communication, or a 5G New Radio (NR) communication.

31. A Vehicle-to-Everything (V2X) entity configured to perform information exchange for a driving maneuver to be executed by a maneuvering vehicle, the V2X entity comprising one of a first device in a first vehicle or a roadside unit (RSU) in communication with the first device, comprising:

a wireless transceiver configured to wirelessly communicate with devices;

at least one memory; and at least one processor coupled to the wireless transceiver and the at least one memory, the at least one processor configured to:

receive, via the wireless transceiver, an inter-vehicle message with a driving maneuver request for a driving maneuver by the maneuvering vehicle, the driving maneuver being associated with maneuvering the first vehicle, the inter-vehicle message comprising at least one estimated parameter for the driving maneuver comprising one or more temporal parameters, one or more spatial parameters, one or more trajectory parameters, or a combination thereof, the inter-vehicle message further comprising an indication of an estimation accuracy for the at least one estimated parameter, wherein the least one estimated parameter for the driving maneuver is based in part on sensor input;

determine whether to grant, reject, or counter-proposal based on the at least one estimated parameter for the driving maneuver and the indication of the estimation accuracy for the at least one estimated parameter and a predicted location and motion state of the first vehicle; and transmit, via the wireless transceiver, a grant, a rejection, or a counter-proposal determined based on the driving maneuver request.

32. The first device of claim 31, wherein the one or more temporal parameters comprises a start time and a stop time for the driving maneuver, and wherein the indication of the estimation accuracy comprises a start time estimation accuracy and a stop time estimation accuracy.

33. The first device of claim 31, wherein the one or more spatial parameters comprises a start location and a stop location for the driving maneuver, and wherein the indication of the estimation accuracy comprises a start location estimation accuracy and a stop location estimation accuracy.

34. The first device of claim 31, wherein the one or more spatial parameters comprises a start time longitudinal distance to leading vehicle and a start time longitudinal distance to trailing vehicle for the driving maneuver, and wherein the indication of the estimation accuracy comprises a leading vehicle distance estimation accuracy and a trailing vehicle distance estimation accuracy.

35. The first device of claim 31, wherein the one or more trajectory parameters comprises an estimated time of arrival (ETA) for each intended trajectory segment and an estimated time to pass (ETP) for each intended trajectory segment for the driving maneuver, and wherein the indication of the estimation accuracy comprises an ETA estimation accuracy for each intended trajectory segment and an ETP estimation accuracy for each intended trajectory segment.

36. The first device of claim 31, wherein the at least one estimated parameter and the indication of the estimation accuracy for the at least one estimated parameter are information elements in application-layer messages.

37. The first device of claim 31, wherein to receive the inter-vehicle message, the at least one processor is configured to receive the inter-vehicle message directly from a second device in the maneuvering vehicle.

38. The first device of claim 31, wherein to receive the inter-vehicle message, the at least one processor is configured to receive the inter-vehicle message from a roadside unit.

39. The first device of claim 31, wherein to receive the inter-vehicle message, the at least one processor is configured to receive the inter-vehicle message in a Device-to-Device (D2D) communication link.

40. The first device of claim 39, wherein the D2D communication link comprises a dedicated short-range communication (DSRC), a cellular Vehicle-to-Everything (C-V2X) communication, or a 5G New Radio (NR) communication.

* * * * *